United States Patent Office 2,924,532
Patented Feb. 9, 1960

2,924,532
RESINOUS FLAMEPROOFING COMPOSITION

John E. Dereich, Painesville, Ohio, assignor to Diamond Alkali Company, Cleveland, Ohio, a corporation of Delaware No Drawing. Application September 9, 1957
Serial No. 682,611

5 Claims. (Cl. 106—15)

This invention relates to flameproofing compositions particularly for use in combination with organic plastic materials, and more particularly relates to compositions rendering such materials flameproof without destroying other of their valuable and sometimes necessary properties. Important among the properties that are desired to be preserved in organic plastic materials, in a wide variety of applications, are transparency, translucency and color stability. Since the organic plastic materials with which the invention is concerned normally are molded for most applications, it is frequently desired to render them flameproof without impairing, specifically, the property of moldable ability by any method desired to be practiced. The invention relates also to organic plastic materials incorporating the flameproofing compositions described herein, and such materials are referred to hereinafter for convenience as final flameproofed compositions. Additionally, the invention relates to methods for prepairing, compounding and molding the final flameproofed compositions.

This application is a continuation-in-part of my copending application Serial No. 405,257, filed January 20, 1954, now abandoned.

In general, the invention is directed to a flameproofing composition comprising a highly chlorinated high molecular weight aliphatic material and an organic derivative of hydrated antimonous oxide hereinafter referred to as an organic antimonyl compound, these two ingredients performing the flameproofing function of the composition. Further, the invention optionally envisions that the flameproofing compositions may include, or at the time of use in preparing the final flameproofed composition of the invention, have incorporated into the organic plastic materials, a suitable stabilizer which is effective in preventing decomposition of the chlorinated aliphatic materials under conditions of ordinary usage and under conditions of preparing and using the final flameproofed compositions; such stabilizer, where desirable in the composition, characteristically exerts substantially no stabilizing effect at flame temperatures. The invention further contemplates that the flameproofing compositions may include, or, at the time of use in preparing the final flameproofed compositions of the invention, have incorporated into the organic plastic materials, additional materials effective to impart color, and materials to color-stabilize the ultimate products, to impart any desired lasting decorative effect. Still other materials performing plasticizing, softening, antifoaming and lubricating functions are contemplated as optionally to be included in the final flameproofed compositions.

It has heretofore been proposed to provide flameproofing compositions especially suitable for use in flameproofed organic plastic, resinous or polymeric materials, for example, in Rugar, U.S. Patent No. 2,590,211. This patent suggests a flameproofing composition comprising a highly chlorinated organic material, such as highly chlorinated organic aliphatic compounds having more than 8 carbon atoms and having between 50% and 80% of chemically combined chlorine, and an inorganic metal compound, such as antimony oxide. Since the advent of the teachings of the above-mentioned patent, the demand for organic plastic or resinous products for use in a wide variety of applications has increased many fold. For example, it is now desired to employ organic plastic or resinous materials as herein described in prefabricating many appliance items for homes and buildings, such as bathroom equipment of all types, kitchen cabinets and the like, cabinets for housing electrical appliances, furniture of various description, and many other similar applications. Also, these organic resinous and plastic materials are desirable for use as materials of construction in the building of homes and other structures, such as transparent or translucent wall panels, door or window inserts, awnings, sky lights, patio covers or roofs and the like. These materials are also coming into use as materials of construction in many industrial applications, such as in gasoline tanks, storage tanks, automobile bodies, large power boats and the like. In most, if not all, of these applications, the fire hazard that is involved is of prime importance. Additionally, because of the decorative and lighting effects which are sought to be achieved in some applications of such materials, particularly in paneling and certain types of awnings, translucency, and in some cases transparency, is an important, and sometimes indispensable property.

With the growing demand for organic plastic or resinous materials in these various new uses, need has arisen for flameproofing compositions which do not impair the properties that are desirable or necessary in the material for a particular environment. While the teachings of the prior art, particularly U.S. Patent No. 2,590,-211, eminently satisfy the requirement that the organic plastic materials be flameproof, the use of, for example, antimony oxide in combination with a highly chlorinated organic material either renders the organic plastic product fabricated therefrom substantially opaque or deleteriously modifies its ability to take color and thereby somewhat limits the use of organic plastic products in their many numerous desirable applications.

Accordingly, a primary object of this invention is to provide a flameproofing composition which may be employed with organic plastic, resinous, or polymeric materials, thereby rendering them flameproof while at the same time not altering their desirable characteristics, especially in application of the materials to decorative uses.

As noted above, the present invention envisions the solution of the problem of more general application of organic plastic materials to various, now restricted uses, by flameproofing them to a point that the compounded materials, for all practical purposes, fail to support combustion. The expression "fail to support combustion" in this connection is used to describe the ultimate result of applying a flame, such as a flame from burning wood or the like, to the organic plastic material until the same appears itself to flame, then removing the applied flame, after which the flame on the organic plastic material disappears within a period of no more than about three seconds and usually within a period of no more than one second. This standard of performance is considerably more rigid than that imposed by the American Society for Testing Materials, and this fact will appear more fully from a comparison therewith of the test employed in connection with this invention.

In contrast to the materials produced in accordance with this invention, organic plastic or resinous materials such as polystyrene and the polyester resins, characteristically burn quite readily and continue to burn very freely after the removal of the flame therefrom, in the procedure described above, until the burning object is substantially entirely consumed. An object fabricated of organic plastic material to which a similar flame from burning wood is applied, and which object has incorporated therein the flameproofing composition of this invention, flames out almost at once, that is to say, within about two seconds after the flame has been removed therefrom.

The present invention imposes substantially no restrictions or limitations upon the processing or fabrication of the organic resinous materials. Thus, the flameproofing composition may be incorporated into the organic materials either in the unpolymerized, partially polymerized and, in the case of thermoplastic organic materials, in the completely polymerized state, depending of course upon the physical characteristics (liquid, solid or gas) of the monomeric material, partially polymerized monomeric material or completely polymerized material, and the processing or fabricating requirements of the user. Conveniently, the flameproofing composition of the present invention may be combined with a completely polymerized thermosetting or thermoplastic material by mixing the completely polymerized material with the flameproofing composition while the former is in particle form. Such completely polymerized organic materials with the flameproofing materal admixed therewith may be combined thereafter with other suitable materials and formed into products as desired. No extraordinary steps are required in obtaining the ultimate combination of the ingredients; each may be added separately to the organic plastic material, or all may be added at one time.

As examples of the organic plastic materials which are rendered flameproof by combination with the composition of this invention, may be mentioned natural and synthetic plastic materials, such as natural and synthetic rubber, polystyrene, cellulose acetate butyrate or propionate, cellulose acetate, polyethylene, ethyl cellulose, methyl methacrylate and derivatives of methyl methacrylate, such as ethyl, iso-propyl, butyl, and other methacrylates, polyvinyl chloride, the various polyester resins, phenol-aldehyde type thermosetting resins, and the like. The invention, however, is applicable to organic plastic materials, more generally, of all types, and the above specifically mentioned examples of organic plastic materials with which the compositions of the invention may be combined are given for purposes of illustration for those skilled in the art. The invention is especially suitable for use with organic thermoplastic materials such as are employed in molding operations, since the flameproofing compositions of the invention may be mixed with organic thermoplastic materials in whatever form the consumer has them supplied to him, that is to say, in the partially or completely polymerized state. The invention extends to the above organic resinous materials as well as copolymers thereof with themselves and other materials; for example, styrene may be copolymerized with the polyester or other resins either before or after admixture with the flameproofing materials herein. The terms "resinous," "plastic" and "polymeric," as used herein, are to be regarded as synonymous and to extend to any or all of the numerous high molecular-weight-forming or high molecular weight organic materials generally implicit in such terms.

As has been indicated above, the flameproofing compositions of the present invention include essentially a mixture of a highly chlorinated aliphatic material averaging from 18–36 carbon atoms in the molecules thereof, containing from 50–80% of chemically combined chlorine, and an organic antimonyl compound. The highly chlorinated organic material comprises highly chlorinated aliphatic hydrocarbons and mixtures thereof, such as chlorinated paraffin wax, containing about 50–80% of chemically combined chlorine and having an average molecular weight corresponding to a $C_{24}$ carbon atom chain, chlorinated to the extent indicated. Where such chlorinated wax contains from 50% to about 65% of chemically combined chlorine, the chlorinated wax produces some plasticizing effect, in addition to flameproofing, which may be desirable in the final flameproofed composition. Where the function of the chlorinated paraffin wax is solely that of imparting flameproofing it is preferable to use chlorinated paraffin wax, containing 68–73% chemically combined chlorine and excellent results are achieved by using specifically a chlorinated paraffin wax having the empirical formula $C_{24}H_{29}Cl_{21}$.

The organic antimonyl compounds to be used in the compositions of the present invention are suitably derived from a wide variety of hydroxy organic materials. According to the present invention, it has been found that hydroxy aryl and alkyl derivatives of hydrated antimonous oxide, which derivatives have the antimony linked through an oxygen atom (of a hydroxyl group) to a carbon atom of the aryl or alkyl group, i.e., the compound contains the grouping C—O—Sb=O or

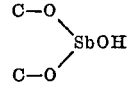

are excellent synergists with the said highly chlorinated high molecular weight aliphatic substances for imparting flameproof properties to resinous organic plastic materials. This mixture may be employed for the purposes of this invention with outstanding results, whereby the extended usage of organic resinous materials is permitted without significant loss of their desirable properties as previously indicated.

Generally, the present invention contemplates that alkyl and aryl derivatives of hydrated antimonous oxide having the hydroxy and carboxy substituents in their structure may be used. Especially suitable antimonyl derivatives are those of hydroxy carboxylic acids, including both aliphatic and aromatic acids. Such acids may be monohydroxy-monobasic, for example, glycollic, lactic and salicylic acids; monohydroxy polybasic acids may also be employed, such as citric, malic and tartronic; in addition, polyhydroxy polybasic acids, for example, mucic and tartaric acids, are especially suitable. Derivatives of various aromatic substances, such as gallic and hydroxybenzoic acid, may be employed. Also, derivatives of dihydroxybenzene are suitable, for example, catechol and pyrogallol. It will be understood that still other hydroxy acids may be employed as well as various derivatives thereof, such as the amino, amide and halogen hydroxy acids. Also, as where the hydroxy acid is also a polybasic acid, the hydrogen of one or all of the carboxyl groups may be replaced by a variety of substituents, such as alkali metals, alkaline earth metals, ammonium, and amines, forming salts, alkyl, alkylene, aryl, aralkyl, aralkylene, and alkaryl, forming esters.

As will appear from the foregoing and more fully hereinafter, the organic substituent of the organic antimonyl substance which may be selected is not restricted unduly in character since, ordinarily, it does not appear to exert a dominant force in the activity of the organic antimonyl substance. Only in the instances where such materials are stable at flame temperatures to a degree that the antimony or antimony oxide portion of the organic antimonyl substance is not released for cooperation with hydrochloric acid released from the chlorinated aliphatic material, is difficultly encountered.

In selecting the organic antimonyl material to be included in the composition, several factors may be considered. One is the "flameout" time desired to be achieved, i.e., the time required for the flameproofed material to extinguish in accordance with the procedure described previously. Another is that it is believed that the organic antimonyl material coacts with hydrogen chloride which is released by decomposition of the chlorinated aliphatic material at flame temperatures. This coaction is thought to be a true chemical action taking place between the hydrogen chloride and the antimonyl constituent. It follows, that the rates of decomposition and reaction may have some influence upon the time required for flameout of a burning material. A further consideration in making the selection of the antimony-containing constituent is the permissible extent to which the organic resinous material may be loaded with the flameproofing composition. Generally, a higher molecular weight antimonyl substance necessarily loads the organic plastic material in greater proportion for a corresponding flameproofing effect. Accordingly, where it is desirable or permissible to load the organic resinous material rather heavily, lower molecular weight antimonyl compounds are generally to be desired. Materials known to be unstable, i.e., decomposing to antimony oxide, under conditions of processing or subsequent use should be avoided for the obvious reason that some or perhaps all of the effectiveness of the flameproofing composition may be destroyed, as well as loss of the desired transparency or translucency.

Additionally, those materials which are relatively soluble in the organic resinous material, especially those that form clear, colorless solutions or dispersions, are particularly desirable since in such cases, pigmenting effects are not encountered and the transparency or the translucency of the final flameproofed composition is not materially impaired. Where translucency or transparency are factors to be considered, an antimonyl compound having the same or substantially the same refractive index as the organic resinous material may desirably be selected regardless of solubility.

It will be appreciated that the various antimonyl compounds function generally similarly in flame-retardant activity. For convenience, reference is hereinafter made to the well-known antimonyl derivatives of tartaric acid specifically, and to salts and esters, and antimonyl derivatives of monopotassium tartrate. Where such terminology is employed, it is to be understood that antimonyl derivatives of other acids and compounds as set forth herein may be substituted. In particular, potassium antimonyl tartrate, otherwise known as tartar emetic, and which is readily available, is quite generally useful and highly effective. Similarly, ammonium antimonyl tartrate, barium antimonyl tartrate, and ethylenediamine antimonyl tartrate are especially suitable, as well as antimonyl catechol. As will be observed, these materials are all relatively low in molecular weight.

Moreover, these compositions have been found especially useful in preparing flameproofed translucent glass fiber-reinforced organic resin panels. In preparing such panels, ordinarily a mold is first coated with a material which prevents adherence of the resin to the mold surface, and a preformed mat of glass fibers is placed therein. Generally, it is preferred that the fibers of the glass mat be pre-sized in a suitable manner so that the fibers freely and uniformly accept, or are wetted by, the resinous material which is subsequently applied to it. Such presizing may comprise the application of a dilute polymer solution, such as a styrene-polyester solution, with subsequent polymerization of the solution on the glass fibers. In this instance, the dilute polymer solution wets the fibers of the mat more completely than does a more concentrated polymer solution, as a result of which, a substantially continuous panel in which the glass fibers can scarcely be observed may be prepared. Where pre-sized fibers are not employed, the fibers may become visible and the panel is impaired considerably in its light-transmitting ability. With the mat in place in the mold, a polymer or polymer-forming composition containing a suitable quantity of flameproofing composition admixed therewith is poured in place over the glass fiber mat. The mold counterpart is placed in position over the polymer fiber association and is then subjected to any suitable procedure for effecting solidification of the polymer material, such as by curing under conditions of heat and pressure, or, in the case of heated thermoplastic materials, by cooling. Of course, the polymer composition, where it is unpolymerized or only partially polymerized, includes a suitable polymerization catalyst, as, for example, in the case of panels formed from one of the polyester type resinous materials. Once cured, the final flameproofed composition of this invention is achieved.

Some of the above-noted highly chlorinated high molecular weight aliphatic materials are known to decompose under the influence of heat, light, and moisture. Particularly, some of them decompose at relatively low temperature conditions; others are decomposed upon prolonged exposure to weather, particularly sunlight. This may lead to discoloration of the final flameproofed composition and deterioration of its flameproof character. Where decomposition of the chlorinated aliphatic material is likely, it is desirable to include in the flameproofing composition, or in the plastic material where it will be effective in the final flameproofed composition, a stabilizer having the effect of rendering the chlorinated aliphatic material stable under the described conditions.

Examples of such stabilizing materials are high melting point derivatives of ethylene oxide, the derivatives being chosen as having a boiling point well above the temperatures necessary for the mixing or molding of the organic plastic material with the flameproofing ingredients. Examples of such materials which are applicable in this connection, depending upon their boiling point, are derivatives of ethylene oxide, propylene oxide, butylene oxide, phenyl ethylene oxide, tolyl ethylene oxide, diphenyl ethylene oxide, phenoxy propylene oxide, diethyl ethylene oxide, benzyl ethylene oxide, epichlorohydrin, glycide or its ethers, such as methyl-, ethyl-, propyl-, tolyl-, alpha or beta naphthyl-, also cyclopentene oxide, cyclohexene oxide, and the like. In general, and in accordance with the above, compounds having an ethylene oxide linkage contained therein and in addition, having a sufficiently high boiling point so that their vapor pressure is not appreciable at the temperature at which the entire material is compounded and molded, are suitable in this connection. Particularly advantageous members of this group of substances are aroxyl substituted propylene oxides, of which phenoxy propylene oxide is an especially suitable member.

In addition there may be used as stabilizers of the general character set forth above, alkaline earth metal salts of aliphatic acids having from five to ten carbon atoms, of which strontium caprylate is an example. Another class of substances particularly suited for this stabilizing purpose are the tetra aryl and alkyl substituted compounds of tin in which the alkyl or aryl groups have from four to twelve carbon atoms and of which tetra butyl tin, tetra phenyl tin, dibutyl diphenyl tin, and dibutyl tin dilaurate are examples. Further examples of stabilizers useful in this connection will occur to those skilled in the art, it being emphasized that the stabilizer to be effective must prevent the substantial evolution of hydrogen chloride from the chlorinated high molecular weight aliphatic material at room and molding temperatures, such as up to 450° F., while being insufficiently of a stabilizing influence to prevent the substantial release of hydrogen chloride at flame temperatures, the amount of the stabilizer employed may be within the range of 1%–10% of the chlorinated high molecular weight aliphatic material used, generally about 5% is sufficient.

It will be appreciated by those skilled in the art that it may be desirable to add various plasticizers to the compositions of this invention either before compounding with the organic plastic materials or during the compounding of the flameproofing composition with the plastic materials. Such plasticizers may include, in addition to chlorinated paraffin wax containing from 50% to about 65% of chemically combined chlorine, phosphoric acid derivatives, such as tricresyl phosphate, triphenyl phosphate and ethyl hexyl phosphate, phthalates, such as dibutyl phthalate and di octyl phthalate, sebacates, such as di octyl sebacate, ricinoleates, such as butyl ricinoleate, glycol derivatives, such as triethylene glycol di-2-butyrate, glycol di-2-butyrate, sulfonamides, such as o- and p-toluene ethyl sulfonamide, laurates, such as amyl laurate, and the like. Where such plasticizers are employed, the amount thereof is generally less than 10% of the final flameproofed composition.

In addition and in particular, to enhance the ease of the injection molding operation where these materials are applied in such applications, the addition of a small percentage of lubricating material, which has the effect of enabling the material to be injection molded without adhering too securely to the molds, thus preventing easy removal, may be employed. Examples of such materials are oleic and stearic acids, alkaline earth stearates and oleates, such as calcium stearate, calcium oleate, and the like.

It will be appreciated that the quantities of the flameproofing composition which may suitably be added to the organic resinous material may vary within rather wide limits and that the principal consideration, insofar as the greatest amount which suitably may be employed is concerned, is the change that the flameproofing composition may make in the essential character of the final flameproofed composition. For example, obviously an amount of the flameproofing composition which exceeds the amount required adequately to perform flameproofing functions might be such that the resinous material no longer would have any of the character of the material that is now contemplated for its use; such large quantities of flame proofing composition are ordinarily not employed. It is contemplated that as a maximum the flameproofing ingredients may comprise as much as about 60–65% by weight of the total weight of the final flameproofed composition. More suitably, however, the invention contemplates that the flameproofing ingredients comprising the flameproofing composition may be between about 10 and about 35% by weight of the final flameproofed composition, and, preferably, for most applications where a high degree of flameproofing is desired with least alteration of the properties of the organic resinous materials, between about 20 and about 30% by weight of the final flameproofed composition. It is to be understood, of course, that the quantity of the flameproofing composition employed in a particular instance is to be decided upon in the light of the active ingredients that it contains since, as is pointed out herein, some flameproofing materials release more hydrogen chloride than others at flame temperatures for reaction with the active organic antimonyl compounds.

It is contemplated within the invention that the flameproofing composition itself contains the two essential flameproofing ingredients within extremely widely-varying amounts, the prime consideration being that whatever quantity is employed of one be at least effective to coact with sufficient of the active ingredient of the other to effect the desired flameproofing functions. It is believed, however, that in most practical operations, extremes in the ratios of the ingredients of the flameproofing composition will not be found feasible or desirable. More generally, the invention contemplates that the flameproofing composition will be composed of about 50 to 96% by weight of the chlorinated aliphatic material and about 4 to 50% by weight of the derivative of hydrated antimonious oxide. Suitably, for most applications, the flameproofing composition contains between about 2 and 6 parts of chlorinated aliphatic material to 1 part of the derivative of hydrated antimonious oxide. As will be seen in the examples hereafter presented, a composition including 80% of the chlorinated aliphatic material and 20% of the derivative of hydrated antimonious oxide is particularly desirable.

While it is believed that those skilled in the art will have no difficulty in practicing the invention described hereinabove, specific examples are provided below which more completely describe the invention. In some of the exemplary material, the term "Paraplex P-43" is employed in describing some of the polymeric materials contemplated by the invention. This expression is a trade term of the Rohm and Haas Company employed to denote certain polyester resins. In this connection, as is now well-known, the term "Paraplex P-43 polyester resin" is applied to resins formed from esters of polyhydric alcohols and polycarboxylic acids, for example, by the esterification of 1,2-propylene glycol with an acid such as sebacic and maleic, a more complete description of which materials may be found in, for example, U.S. Patent No. 2,445,553, along with suitable methods for their preparation.

The term "Paraplex P-43 polyester resin," wherever employed herein, is intended to include the types of resinous material in the said Patent No. 2,445,553; generally similar and equivalent materials that are termined polyesters may be employed within the invention, for example, such materials as are described in U.S. Patent No. 2,333,639, and U.S. applications S.N. 397,741 (Alien Property Custodian holding). Accordingly, the term "polyester resin" should be given its broadest interpretation within the spirit of this invention. It will be understood, it is believed, that the character of the polymeric material with which the flameproofing composition and other herein-suggested additives is combined is in no sense critical as the flameproofing compositions are active irrespective of the resin. For example, the polyester resins may be diluted with styrene and copolymerized while admixed with the flameproofing and other materials herein described. It does not appear that the additives herein suggested to any extent interfere with polymerization procedure. The examples presented herein describe especially useful preparations but are not intended to limit the invention to the particular resins indicated or to precise compositions.

The term "Selectron 5003–L resin" is a trade name of the Pittsburgh Plate Glass Company, and refers to resins obtained from a polyester of the unsaturated alkyd type. More particularly, the term "Selectron 5003–L resin" refers to resins obtained from the copolymerization of a di-allylphthalate and styrene.

Where "Luperco ATC" appears herein, the term is intended to denote the well-known polymerization catalyst including benzoyl peroxide and tricresylphosphate.

Finally, and of considerable significance in long-term stabilization of the final flameproofed composition, exposed to weathering, both as to the highly chlorinated ingredient and as to the polymeric portion of the final flameproofed composition, is a stabilizer against the decoloring and decomposing influence of light, especially in the ultraviolet range of wave length. For this purpose may be used up to about 5% of any of a number of well recognized chemicals which have ultraviolet screening properties. The precise chemical nature of the material used is of no consequence, as the screening of ultraviolet and similar wave length light is apparently a physical phenomenon. Thus, of especial value is phenyl salicylate, as well as other salicylates, such as methyl and ethyl, menthyl and like salicylates, alpha and beta umbelliferone, methyl umbelliferone, methyl aceto umbelliferone, and the like, menthyl anthranilate, substituted benzophenones, i.e., benzophenones having various substituents, such as hydroxyl, halogen, alkoxy, and the like, examples of which are bis(2-hydroxy, 5-chloro) benzophenone and bis(4-methoxy) benzophenone, ethyl p-amino benzoate, quinine disulfate, quinine oleate, oxyquinoline sulfate, and the like. Other materials of like properties will suggest themselves to those skilled in the art.

Example I

The following materials are thoroughly mixed in a suitable container by constant stirring for five minutes with a steel spatula:

| | Parts by weight |
|---|---|
| Polyester resin [1] | 85 |
| Chlorinated paraffin wax containing 70% chemically combined chlorine (empirical formula $C_{24}H_{29}Cl_{21}$) | 15 |
| 50% benzoyl peroxide dissolved in tricresyl phosphate [2] | 4 |
| Cobalt naphthenate | 0.1 |

[1] Designated by the manufacturer as di-alkenyl phthalate copolymerized with styrene—"Selectron 5003–L resin."
[2] Luperco ATC—A trade term of Novadel-Agene Corporation, of Buffalo, New York.

This mixture is poured upon 50 parts by weight of a glass fiber mat, which glass fiber mat is lying on a piece of cellophane which extends four inches beyond each side of the glass fiber mat. A second piece of cellophane is placed on top of the glass fiber mat and the above mixture is worked into the mat with a spatula. When the glass fiber mat has been completely wetted by the above mixture, the composite is cured for five minutes at 260° F.

The cellophane is then removed and the resulting panel is held in a four inch high flame of a Fischer burner for 15 seconds until the panel itself is aflame. Upon removing the panel from the flame, is continues to burn and is still burning after 25 seconds. It is thus seen that when the chlorinated paraffin wax is used as the sole flameproofing component, the polyester resin is not flameproofed.

Example II

The following materials are thoroughly mixed as in Example I:

| | Parts by weight |
|---|---|
| Polyester resin [1] | 85 |
| Potassium antimonyl tartrate | 15 |
| 50% benzoyl peroxide dissolved in tricresyl phosphate [2] | 4 |
| Cobalt naphthenate | 0.1 |

[1] "Selectron 5003–L resin."
[2] "Luperco ATC."

The above mixture is molded into a panel with 50 parts by weight of a glass fiber mat as in Example I. The resulting panel is held in a four inch high flame of a Fischer burner for 15 seconds until the panel itself is aflame. Upon removing the panel from the flame, it continues to burn and is still burning after 25 seconds. It is also seen from this example that when the organic antimonyl compound is used as the sole flameproofing component, the polyester resin is not flameproofed.

Example III

The following materials are thoroughly mixed as in Example I:

| | Parts by weight |
|---|---|
| Polyester resin [1] | 70 |
| Potassium antimonyl tartrate | 15 |
| Chlorinated paraffin wax containing 70% chemically combined chlorine (empirical formula $C_{24}H_{29}Cl_{21}$) | 15 |
| 50% benzoyl peroxide dissolved in tricresyl phosphate [2] | 4 |
| Cobalt naphthenate | 0.1 |

[1] "Selectron 5003–L resin."
[2] "Luperco ATC."

The above mixture is molded into a panel with 50 parts by weight of a glass fiber mat as in Example I. The resulting panel is held in a four inch high flame of a Fischer burner for 15 seconds until the panel itself is aflame. Upon removing the panel from the flame, the flaming of the panel ceases in less than two seconds.

It can thus be seen from the above example that in contrast to Examples I and II, it is only when both the highly chlorinated aliphatic material and the organic antimonyl compound are used that the polyester resin is flameproofed, i.e., the polyester resin is self-extinguishing after being removed from the flame.

Example IV

The following materials are thoroughly mixed in the same manner as in Example I:

| | Parts by weight |
|---|---|
| Paraplex P–43 resin | 78 |
| Chlorinated paraffin wax (70% chlorine) | 10 |
| Potassium antimonyl tartrate | 10 |
| Luperco ATC | 2 |
| Total | 100 |

The mixture is poured upon a glass fiber mat in a prepared panel mold and cured at about 240° F. to a fully polymerized product. The glass mat constitutes about 35% by weight of the product. The panel is tested for flameproofing and found to be self-extinguishing in 2–3 seconds. The panel is translucent. Physical properties of the product are comparable to an untreated polyester panel.

Example V

The mixture of this example is milled in the conventional rubber mill and formed to a sheet. The polyethylene of the mixture is first milled until it becomes plastic and the flameproofing composition is added in increments of about one-third at intervals of about 15 minutes:

| | Parts by weight |
|---|---|
| Polyethylene | 50 |
| Chlorinated paraffin wax (70% chlorine) | 25 |
| Potassium antimonyl tartrate | 25 |
| Total | 100 |

The resulting final flameproofed composition is translucent and flameproof to the same extent as the material prepared in accordance with Example IV.

Example VI

A resin paste mixture, comprising, approximately, 73 parts Paraplex P–43 polyester resin monomer, 20 parts chlorinated paraffin wax (70% chlorine), 5 parts potassium antimonyl tartrate, and 2 parts Luperco ATC, is handled as in Example I to form panels comprising fully polymerized-polymer and having about 35% by weight glass fiber. These panels are examined for inflammability. The product is self-extinguishing within two seconds; its physical properties are only slightly modified. The product is translucent.

Example VII

The mixture of this example is milled in the conventional rubber mill and formed to a sheet. The resinous cellulose acetate butyrate is first milled until it becomes plastic and the thoroughly mixed flameproofing composition is added in increments of about one-third at intervals of about 10 minutes:

| | Parts by weight |
|---|---|
| Cellulose acetate butyrate | 65 |
| Chlorinated paraffin wax (70% chlorine) | 25 |
| Potassium antimonyl tartrate | 10 |
| Total | 100 |

The final flameproofed composition is absolutely flame resistant; it does not burn but only chars; it is slightly more brittle than an untreated sample but this is readily corrected by including a small percentage of a softening material, for example, up to about 10% polyethylene, in the mixture.

Example VIII

A product is formed of the following mixture in accordance with the procedure of Example V:

| | Parts by weight |
|---|---|
| Polystyrene | 70 |
| Chlorinated paraffin wax (70% chlorine) | 20 |
| Potassium antimonyl tartrate | 10 |
| Total | 100 |

This final flameproofed composition is self-extinguishing and burns only for about one second after flame removal. Its physical properties are comparable to an untreated polystyrene.

In the following examples, the chlorinated paraffin wax is first dissolved in styrene and filtered in order to remove impurities in the chlorinated wax. The solution, including about 30% styrene, is then employed in preparing the flameproofing composition and the final flameproofed composition. This procedure is adopted in order to reduce cloudiness and improve transparency of the product. This example also serves to demonstrate that the addition of a light stabilizer has no adverse effect in the process or product.

Example IX

| | Grams |
|---|---|
| Paraplex P–43 polyester resin | 137.0 |
| Chlorinated paraffin wax (70% chlorine) and styrene | 53.0 |
| Ammonium antimonyl tartrate | 10.0 |
| Phenyl salicylate (light stabilizer) | 1.6 |
| Luperco ATC | 4.0 |

This mixture is handled in the manner of Example I to form a panel containing about 35% fiber glass. The product is self-extinguishing, the flame dying in less than two seconds and cloudiness is considerably reduced. The substitution of the ammonium derivative introduces no new factors over the potassium derivative of the tartrate.

Example X

A product prepared as in Example IX from a mixture including barium antimonyl tartrate, the mixture containing the ingredients in the same weight ratio exhibits substantially identical properties, in all respects, to those of the product of Example IX. Flameout time is about one second.

Example XI

A product is prepared exactly as in Example IX except that ethynenediamine antimonyl tartrate is substituted for the ammonium derivative, weight ratios remaining the same, however. The product is almost completely transparent; its flameout time is excellent, although such time is improved by a slightly greater quantity of the flameproofing composition than is employed in the case of the ammonium derivative. In this example, the flameout time is about three seconds.

Example XII

A polystyrene panel is formed from the following materials in accordance with the procedure of Example V:

| | Grams |
|---|---|
| Polystyrene | 150 |
| Chlorinated paraffin wax (70% chlorine) | 70 |
| Antimonyl catechol | 10 |

The properties of the product are substantially identical with those of the products of foregoing examples, flameout time being almost immediate.

It should be noted that while the invention has been described in relation to molded resinous materials, the flameproofing composition may be applied to various other materials with similar advantages. For example, the composition may be employed to flameproof various cellulosic materials, such as paper, wood and textiles. Also, it may be combined with various coating compositions, especially highly inflammable paints. Of course, it will be appreciated that organic resinous materials may be flameproofed regardless of form; for example, synthetic fiber fabric may be treated. Still other uses will occure to those skilled in the various arts.

The term "flameproof" as used herein has specific reference to failure to support combustion under fire conditions as encountered in, for example, burning dry wood. It is to be contrasted with "fireproof," which is more nearly exemplified by mineral materials, viz., asbestos, which does not assist combustion under any but the most drastic conditions. Accordingly, specific reference to "flameproofing" or the like should not be interpreted as limiting the invention within the specific connotation of the word.

While there have been described various embodiments of the invention, the methods and products described are not intended to be understood as limiting the scope of the invention, as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A flameproofed composition consisting essentially of a transparent, organic, high polymeric plastic material selected from the group consisting of polyester resins, polyethylene, cellulose acetate butyrate and polystyrene combined with 10–65% by weight of a composition consisting essentially of 50–96% by weight of a chlorinated aliphatic hydrocarbon containing 50–80% by weight of chemically combined chlorine and having 18 to 36 carbon atoms and 4–50% by weight of an aliphatic antimonyl compound selected from the group consisting of potassium antimonyl tartrate, ammonium antimonyl tartrate, barium antimonyl tartrate, ethylenediamine antimonyl tartrate and antimonyl catechol.

2. The composition as claimed in claim 1 wherein the aliphatic antimonyl compound is potassium antimonyl tartrate.

3. The composition as claimed in claim 1 wherein the aliphatic antimonyl compound is barium antimonyl tartrate.

4. The composition as claimed in claim 1 wherein the aliphatic antimonyl compound is ammonium antimonyl tartrate.

5. The composition as claimed in claim 1 wherein the aliphatic antimonyl compound is ethylenediamine antimonyl tartrate.

References Cited in the file of this patent

UNITED STATES PATENTS

| 2,547,671 | Sostmann et al. | Apr. 3, 1951 |
| 2,664,411 | Cooper | Dec. 29, 1953 |

UNITED STATES PATENT OFFICE
CERTIFICATE OF CORRECTION

Patent No. 2,924,532                                          February 9, 1960

John E. Dereich

It is hereby certified that error appears in the printed specification of the above numbered patent requiring correction and that the said Letters Patent should read as corrected below.

Column 4, lines 15 and 16, and line 34, for "antimonous", each occurrence, read -- antimonious --; column 11, line 51, Example XI, for "ethynenediamine" read -- ethylenediamine --.

Signed and sealed this 2nd day of August 1960.

(SEAL)
Attest:

KARL H. AXLINE
Attesting Officer

ROBERT C. WATSON
Commissioner of Patents

UNITED STATES PATENT OFFICE

CERTIFICATE OF CORRECTION

Patent No. 2,924,532            February 9, 1960

John E. Dereich

It is hereby certified that error appears in the printed specification of the above numbered patent requiring correction and that the said Letters Patent should read as corrected below.

Column 4, lines 15 and 16, and line 34, for "antimonous", each occurrence, read -- antimonious --; column 11, line 51, Example XI, for "ethynenediamine" read -- ethylenediamine --.

Signed and sealed this 2nd day of August 1960.

(SEAL)
Attest:

KARL H. AXLINE
Attesting Officer

ROBERT C. WATSON
Commissioner of Patents